(12) United States Patent
McHugh et al.

(10) Patent No.: US 12,088,455 B2
(45) Date of Patent: Sep. 10, 2024

(54) SYSTEM AND METHOD FOR MONITORING HARDWARE AND SERVICES

(71) Applicant: Ganart Technologies, Inc., Carrollton, TX (US)

(72) Inventors: Wayne Thomas McHugh, Little Elm, TX (US); Arthur Martin Holbrook, Carrollton, TX (US); Mohamed Safir Salihu, Coppell, TX (US); Purnendu Mishra, Frisco, TX (US)

(73) Assignee: Ganart Technologies, Inc., Dallas, TX (US)

( * ) Notice: Subject to any disclaimer, the term of this patent is extended or adjusted under 35 U.S.C. 154(b) by 204 days.

(21) Appl. No.: 17/007,202

(22) Filed: Aug. 31, 2020

(65) Prior Publication Data

US 2020/0402157 A1    Dec. 24, 2020

Related U.S. Application Data

(60) Continuation of application No. 14/309,699, filed on Jun. 19, 2014, now abandoned, which is a division of
(Continued)

(51) Int. Cl.
*H04L 41/0659* (2022.01)
*G06F 21/30* (2013.01)
(Continued)

(52) U.S. Cl.
CPC ........ *H04L 41/0659* (2013.01); *G06F 21/305* (2013.01); *G06F 21/32* (2013.01);
(Continued)

(58) Field of Classification Search
CPC ......... G06Q 20/1085; G06Q 20/40145; G06Q 20/02; G06Q 20/40; G06Q 20/401;
(Continued)

(56) References Cited

U.S. PATENT DOCUMENTS

| | | |
|---|---|---|
| 5,878,405 A | 3/1999 | Grant et al. |
| 6,199,099 B1 | 3/2001 | Gershman et al. |

(Continued)

FOREIGN PATENT DOCUMENTS

| | | | | |
|---|---|---|---|---|
| DE | 19919726 A1 | * | 11/2000 | ......... G06K 9/00006 |
| EP | 977163 A2 | * | 2/2000 | ......... G06Q 20/1085 |

(Continued)

*Primary Examiner* — Gregory Todd

(57) ABSTRACT

A system for enabling users to register to use external financial services comprises a central office comprising an operating platform including a communication interface and a user database having a plurality of records for individual users; wherein the central office communicates via the communication interface with a plurality of remote formless, self-service registration stations; whereby a registration station scans an identification card with a card scanner, photographs the user to create a verification image and records a biometric parameter unique to the user, whereupon the registration station transmits an image of the identification card, the biometric parameter and the verification image to the central office; wherein the operating platform translates text from the identification card and creates a record for the user and wherein the operating platform uses the translated text to populate fields in the user record and retrieves and displays the record to an administrator for review.

17 Claims, 16 Drawing Sheets

Related U.S. Application Data application No. 14/245,523, filed on Apr. 4, 2014, now abandoned, which is a continuation of application No. 13/826,537, filed on Mar. 14, 2013, now abandoned.

(60) Provisional application No. 61/644,878, filed on May 9, 2012.

(51) Int. Cl.
  *G06F 21/32* (2013.01)
  *G06Q 20/10* (2012.01)
  *H04L 41/0604* (2022.01)
  *H04L 41/0631* (2022.01)
  *H04L 43/0817* (2022.01)
  *G06Q 20/40* (2012.01)
  *G06Q 40/02* (2023.01)
  *H04L 41/0803* (2022.01)

(52) U.S. Cl.
  CPC ..... *G06Q 20/1085* (2013.01); *H04L 41/0627* (2013.01); *H04L 41/0645* (2013.01); *H04L 43/0817* (2013.01); *G06Q 20/40* (2013.01); *G06Q 20/401* (2013.01); *G06Q 40/02* (2013.01); *H04L 41/0803* (2013.01)

(58) Field of Classification Search
  CPC ...... G06F 21/32; G06F 13/385; G06F 21/305; H04L 41/0803; H04L 43/0817; H04L 41/0627; H04L 41/0645; H04L 41/0659
  See application file for complete search history.

(56) References Cited

U.S. PATENT DOCUMENTS

| | | | |
|---|---|---|---|
| 6,519,571 | B1 | 2/2003 | Guheen et al. |
| 6,775,729 | B1 | 8/2004 | Matsuo et al. |
| 7,401,264 | B1 * | 7/2008 | Gill .................. G07F 9/026 902/8 |
| 7,519,653 | B1 | 4/2009 | Coutts et al. |
| 7,543,020 | B2 | 6/2009 | Walker et al. |
| 7,606,401 | B2 | 10/2009 | Hoffman et al. |
| 7,725,393 | B2 | 5/2010 | Drummond et al. |
| 7,937,329 | B1 | 5/2011 | Cooperstone et al. |
| 8,033,375 | B2 | 10/2011 | Doran et al. |
| 8,397,108 | B1 * | 3/2013 | Vannatter ............ G06Q 30/00 714/57 |
| 8,429,068 | B1 | 4/2013 | Fasoli et al. |
| 8,463,669 | B2 | 6/2013 | Cacheria, III et al. |
| 8,751,338 | B2 | 6/2014 | Dombroski et al. |
| 9,117,092 | B2 | 8/2015 | Lemieux et al. |
| 10,005,281 | B2 | 6/2018 | Yoshida et al. |
| 2002/0032655 | A1 | 3/2002 | Antonin et al. |
| 2002/0065909 | A1 | 5/2002 | Han |
| 2002/0169790 | A1 | 11/2002 | Lee |
| 2003/0055782 | A1 | 3/2003 | Slater |
| 2003/0065618 | A1 | 4/2003 | VanDeBoe |
| 2004/0088551 | A1 | 5/2004 | Dor et al. |
| 2004/0098740 | A1 | 5/2004 | Maritzen et al. |
| 2004/0133477 | A1 | 7/2004 | Morris et al. |
| 2004/0139018 | A1 | 7/2004 | Anderson et al. |
| 2004/0240711 | A1 | 12/2004 | Hamza et al. |
| 2005/0066331 | A1 | 3/2005 | Inoue et al. |
| 2005/0076020 | A1 | 4/2005 | Huntley et al. |
| 2006/0050862 | A1 | 3/2006 | Shen et al. |
| 2006/0059047 | A1 | 3/2006 | Cardone et al. |
| 2007/0130338 | A1 | 6/2007 | Malik et al. |
| 2007/0168290 | A1 | 7/2007 | Robinson |
| 2007/0180490 | A1 | 8/2007 | Renzi et al. |
| 2007/0192652 | A1 | 8/2007 | Kao et al. |
| 2007/0198287 | A1 | 8/2007 | Outwater |
| 2007/0198432 | A1 | 8/2007 | Pitroda et al. |
| 2007/0198665 | A1 | 8/2007 | Matteis et al. |
| 2007/0226785 | A1 | 9/2007 | Chow et al. |
| 2007/0234410 | A1 | 10/2007 | Geller |
| 2008/0010375 | A1 | 1/2008 | Coleman et al. |
| 2008/0041942 | A1 | 2/2008 | Aissa |
| 2008/0103970 | A1 | 5/2008 | Books et al. |
| 2008/0120129 | A1 | 5/2008 | Seubert et al. |
| 2008/0191008 | A1 | 8/2008 | Manfredi et al. |
| 2009/0100178 | A1 | 4/2009 | Gonzales et al. |
| 2009/0132819 | A1 | 5/2009 | Lu et al. |
| 2009/0150711 | A1 | 6/2009 | Kami et al. |
| 2009/0192926 | A1 | 7/2009 | Tarapata |
| 2009/0210240 | A1 | 8/2009 | Benschop et al. |
| 2010/0005461 | A1 | 1/2010 | Shribman et al. |
| 2010/0076790 | A1 | 3/2010 | Benja-Athon |
| 2010/0180031 | A1 | 7/2010 | Cacheria et al. |
| 2013/0264384 | A1 * | 10/2013 | Wadia .............. G06Q 20/40145 235/379 |
| 2015/0306875 | A1 | 10/2015 | Nishimura et al. |
| 2021/0183235 | A1 * | 6/2021 | Giobbi ................ G07F 17/3239 |

FOREIGN PATENT DOCUMENTS

| | | | | |
|---|---|---|---|---|
| EP | 1089206 | A2 * | 4/2001 | ........... G06Q 20/108 |
| GB | 2349776 | A * | 11/2000 | ............. G06Q 20/04 |

\* cited by examiner

CUSTOMER RECORD

NAME
CUSTOMER PERSONAL
IDENTIFICATION CODE (CID)

SOCIAL SECURITY
NUMBER (SSN)

DRIVER'S LICENSE NUMBER

DRIVER'S LICENSE
EXPIRATION DATE

LIBRARY CARD NUMBER

ADDRESS
    STREET
    CITY
    STATE
    ZIP

SYSTEM AND METHOD FOR MONITORING HARDWARE AND SERVICES

CROSS-REFERENCE TO RELATED APPLICATIONS

This application is a continuation of U.S. patent application Ser. No. 14/309,699, filed Jun. 19, 2014, entitled SYSTEM AND METHOD FOR FORMLESS, SELF-SERVICE REGISTRATION FOR ACCESS TO FINANCIAL SERVICES, which is a divisional of U.S. patent application Ser. No. 14/245,523, filed Apr. 4, 2014, entitled SYSTEM AND METHOD FOR FORMLESS, SELF-SERVICE REGISTRATION FOR ACCESS TO FINANCIAL SERVICES, which is a continuation of U.S. patent application Ser. No. 13/826,537, filed Mar. 14, 2013, entitled SYSTEM AND METHOD FOR FORMLESS, SELF-SERVICE REGISTRATION FOR ACCESS TO FINANCIAL SERVICES, which claims the benefit of U.S. Provisional Application No. 61/644,878, filed May 9, 2012, entitled SYSTEM AND METHOD FOR FORMLESS, SELF-SERVICE REGISTRATION FOR ACCESS TO FINANCIAL SERVICES. U.S. patent application Ser. Nos. 14/309,699, 14/245,523, 13/826,537 and 61/644,878 are herein incorporated by reference in their entirety.

TECHNICAL FIELD

The following disclosure relates to a system and method for formless registration of an unbanked user for financial and similar services.

BACKGROUND

The availability of self-service financial technology and devices such as automated teller machines, (ATMs), and similar devices has grown exponentially over the past several years. Such devices typically provide banking, funds transfer, bill payment services and the like to customers of a financial institution. However, the devices and systems used to provide such financial transactions have typically been limited to services provided by a given financial service provider. Some devices do allow for multiple services from a common location, but such service typically requires a dedicated VPN connection between the device and the service provider. In order to utilize such services, a customer must typically have an account with a financial service provider and/or a credit, debit or similar card issued by the service provider. For example, self-service ticket machines are typically limited to dispensing tickets and require the use of a credit card or debit card to complete a purchase. To obtain a credit card or debit card, a user is typically required to fill out one or more forms and submit the completed form to the bank or other financial institution which processes the form, opens an account for the customer and provides the customer with a card that enables the customer to access and utilize the services provided by the financial institution and other entities.

Currently, however, there are significant populations of unbanked or under-banked consumers that do not have access to such services for a number of reasons. Members of such populations may not have a credit or debit card for a variety of reasons; for example, language barriers, cultural factors, or simply a lack of knowledge. Some customers may simply not wish to deal with the paperwork required to obtain a credit or debit card. Such customers may also be unwilling to complete on-line forms that are commonly used to register for financial and similar services. Unbanked or under-banked populations may reside in geographic region(s) where financial service providers do not maintain branch offices due to demographic factors. The economics of locating an office or store front such as a branch bank office in such regions may preclude financial service providers from locating store fronts or branch offices in these regions. Additionally, postal services may be limited or non-existent in such regions.

SUMMARY

In one aspect thereof, a method for enabling users to access financial services of subscribing financial services with a central verification system includes creating a verifiable user profile for a given user. The user presents, at a fixed location, a verifiable identification (ID) with a photo attached that can be verified by a third party as being associated with the photograph on the verifiable ID. One or more biometrics of the given user are input and a photograph of the user is taken proximate to the fixed location at which the verifiable user ID and the biometrics are input. The verifiable ID, biometrics and photograph are transmitted to the central verification system which provides a unique code to the given user after receipt of the verifiable ID, the input biometrics and the photograph. A financial transaction may be initiated by presenting, at a financial transactions location, a list of available financial services to the given user in response to the given user being proximate to the location. At least one of the available financial services is from the group of the subscribing financial services. The user selects the subscribing financial service and a photo of the user is taken with a camera disposed at the financial transactions location.

One or more biometrics and the user's unique code are received at the financial transactions location and the code, biometrics and photo are transmitted to the central verification system which verifies that the received biometrics and code are in fact associated with the central verification system. The financial transaction is then allowed to proceed. The method includes completing the transaction after verification. The operation of creating the verifiable user profile is conducted at a physical kiosk having an input device for receiving a verifiable user ID with photograph and the biometrics in addition to having a camera associated therewith for taking a photograph.

The physical kiosk includes the capability to take more than one photograph, with at least one being known by the given user taken at the time of inputting the information. The other photographs are capable of being taken at different times proximate to the time of input of the information. Multiple cameras at different angles may be provided, such that at least one of the cameras is known to the user at the time the information is input during the creation operation and the other cameras being hidden from the given user's knowledge and possibly the view of the given user before taking pictures also proximate in time to the time of input of either verifiable IDs or biometrics.

In another aspect, the financial transactions location for conducting a transaction includes at least one additional camera for taking a photograph unknown to the user at the time of initiating the financial transaction. The step of presenting a list of financial services provides an indicator for the subscribing financial service to indicate to the given user the one of the available financial services associated with the verifiable user profile. A display is provided at the fixed location.

In one variation, a system for enabling users to register to use external financial services comprises a central office including an operating platform having a processor and a communication interface. The central office further includes a user database having a plurality of records for individual users stored on a database. The user records each includes a user customer identification number, the user's name and address, an image of an identification card of the user, a verification image of the user and an associated biometric parameter of the user. The central office is operative to communicate via the communication interface with a plurality of formless, self-service registration stations remote from the central office. Each of the formless, self-service registration stations includes a camera operable to create a user verification image, a card scanner operable to create an image of an identification card of the user, a biometric scanner operable to record a biometric parameter of the user and a user interface adapted to enable a user to initiate a registration procedure for registering a user.

In some variations, the user interface is operable to enable a user to enter a customer identification code during the registration process. The user's verifiable customer identification card is then scanned by the user with the card scanner. The customer identification card includes the user's name and address. The self-service formless registration station photographs the user to create a verification image of the user and records a biometric parameter unique to the user. The self-service formless registration station then transmits an image of the verifiable customer identification card, the biometric parameter and the verification image of the user to the central office. The operating platform is operable to translate text from the user's customer identification card including the user's name and address. The operating platform is also operable to create a record for the user including a customer identification number for the user, the verification image of the user, the image of the user's identification card and the translated text from the user's identification card. The operating platform uses the translated text to populate fields in the user record including the user's name and address. The operating platform is further operable to retrieve and display a user record including the user verification image, the image of the user identification card and the user's name and address to an administrator for review of the user record. Thus, the system and method disclosed herein enables a user to register to use financial and similar services without filling out paper or online forms.

BRIEF DESCRIPTION OF THE DRAWINGS

For a more complete understanding, reference is now made to the following description taken in conjunction with the accompanying drawings in which.

DETAILED DESCRIPTION

Figure 1A:
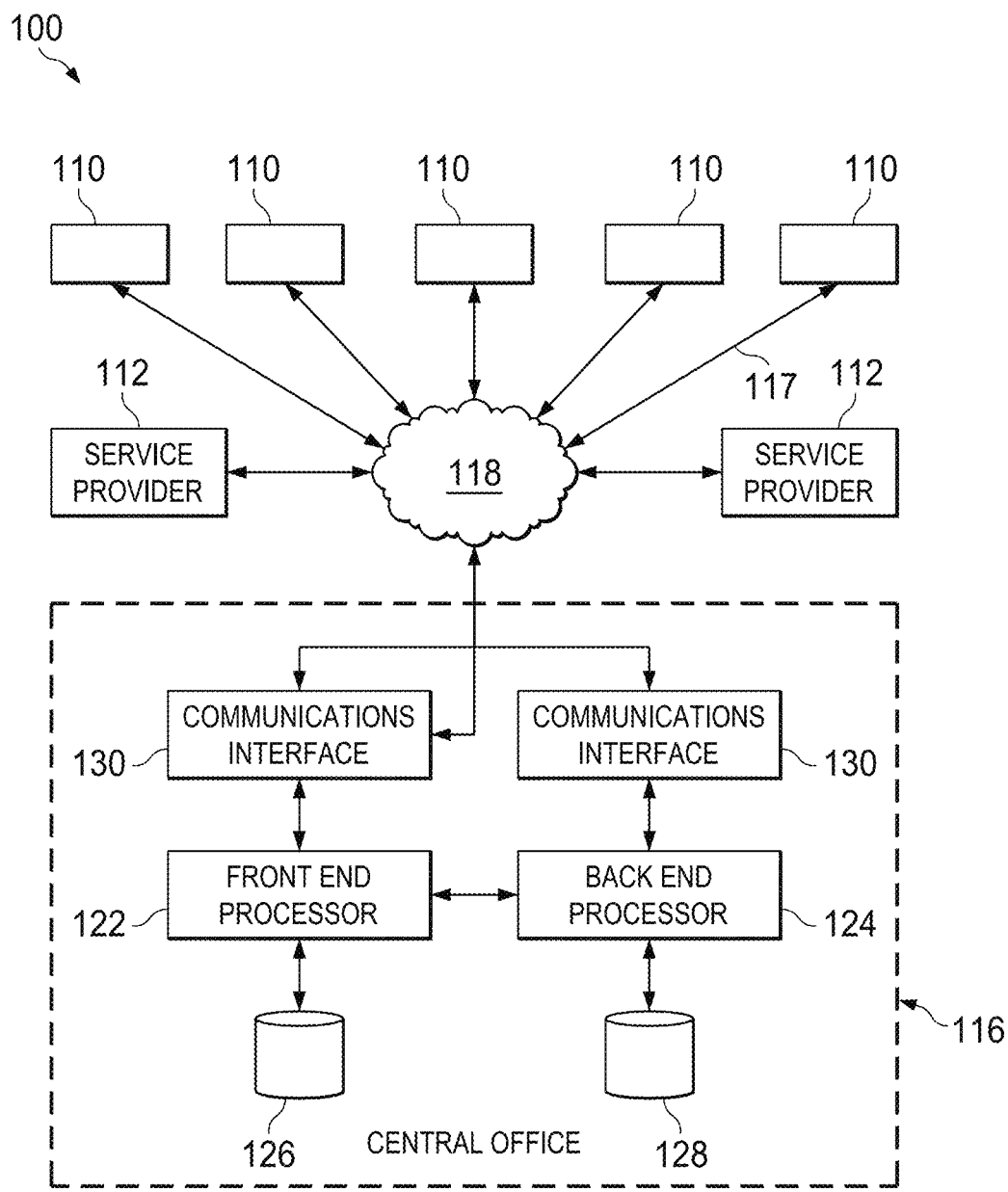
FIG. 1A is a schematic representation of a system as disclosed and described herein.

Referring now to the drawings, wherein like reference numbers are used herein to designate like elements throughout, the various views and embodiments of a system and method for formless, self-service registration for access to financial services are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1A is a schematic representation of a system 100 as described herein. In one embodiment, system 100 includes a plurality of user terminals or kiosks 110. Each of the terminals 110 may have a different "character" depending on the service modules (or external resources) available at the terminal 110. In different variations, terminals 110 may be linked to the central office 116 by means of a network 118 such as a local area network, a GSM connection or by means of the public telephone system (POTS). Central office 116 interfaces with service providers 112 via network 118 which may be utilized to access and/or obtain service modules corresponding to the services offered by the different service providers. Service providers 112 may include a variety of financial institutions such as banks, credit card companies and other financial service providers.

As illustrated, central office 116 includes a front end processor 122 and a back end processor 124, which together, may be referred to as the "central office processor." Databases 126 and 128 are associated with front and back end processors 122 and 124, respectively. Database 126 may include information regarding the configuration, (i.e., the identity of and the services enabled on different terminals 110) along with the information required to interface with the terminals. Central office 116 includes a user verification system as operative to verify the identity of a user when the user creates an account and when the user conducts financial transactions as hereinafter described. Database 128 may include information required to interface with service providers 112, such as information required to format information for use by a selected service provider 112, as well as the information required to receive and process information received from the service providers. User profiles with such information as age, gender, biometric parameter data such as a palm vein scan or fingerprint scan, the user's service history and other information may be stored on database 126, database 128 or both. Additional data such as transaction data, logs, analysis data and results and performance data may also be stored on either or both of database 126 and database 128. Each of the processors 122, 124 has an associated data interface (hardware) for communicating with terminals 110 and service providers 112.

Each of the terminals 110 is configured as an independent interface to a particular user utilizing that particular terminal 110. Each of the terminals 110, as will be more fully described hereinbelow, has associated therewith service modules or external resources that will allow the user to effectively interface with the service provider 112 to both input information to the system for use in the transaction and to receive an output from the transaction, if such is appropriate, this being a transaction-dependent operation. During the transaction, there will be many interactions between the terminal 110 and the central office 116, this interaction allowing less of the transaction to be implemented on the terminal 110 and more to be implemented on the central office. System 100 may be the same as, or similar to the system described in U.S. Publication No. 2010/0179990, published Jul. 15, 2010, U.S. patent application Ser. No. 12/684,929, to Cacheria, et al., filed Jan. 9, 2010, the disclosure of which is incorporated herein for all purposes.

Figure 1B:
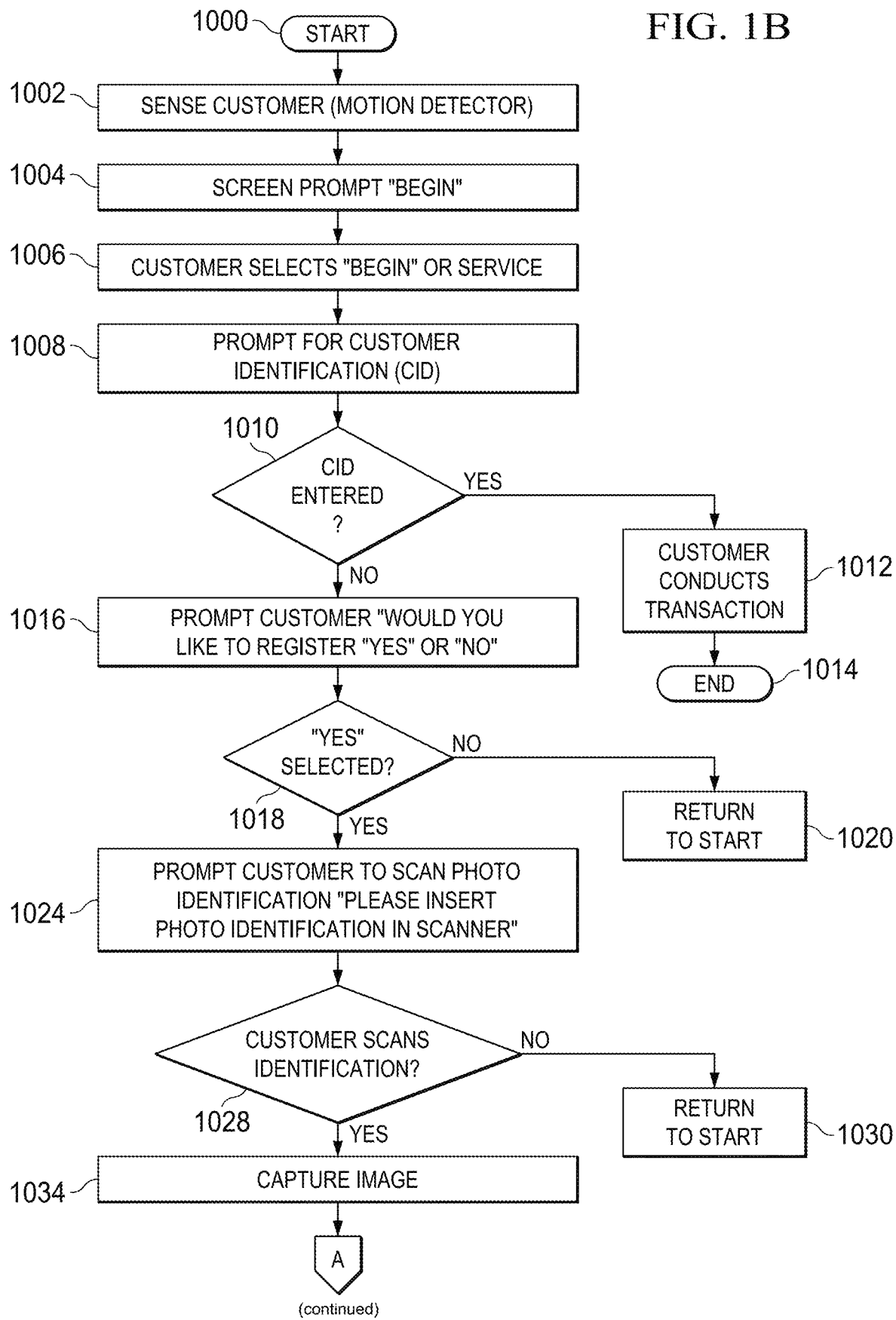
FIG. 1B is a flow chart illustrating the method of FIG. 1A.
Figure 1B:
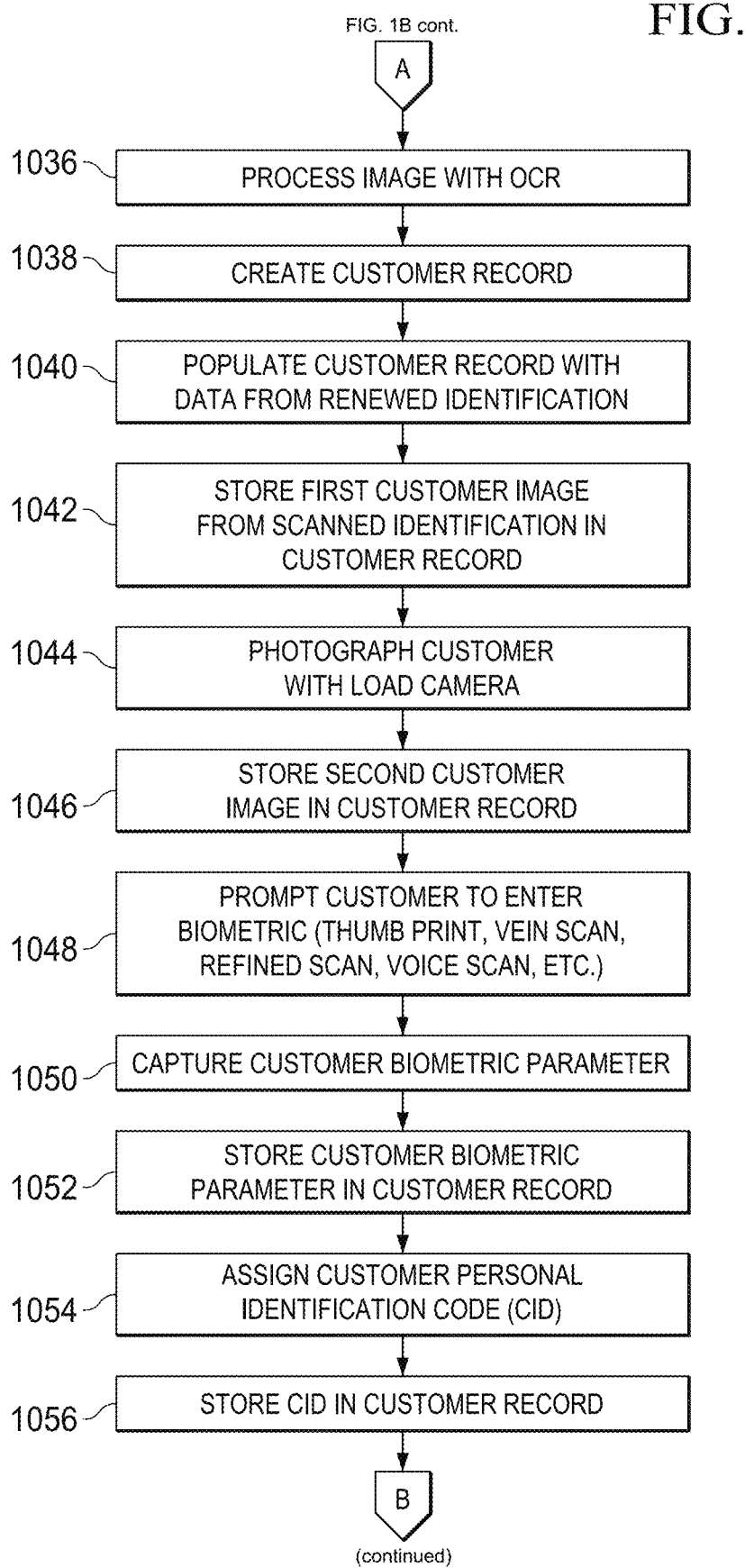
Figure 1B:
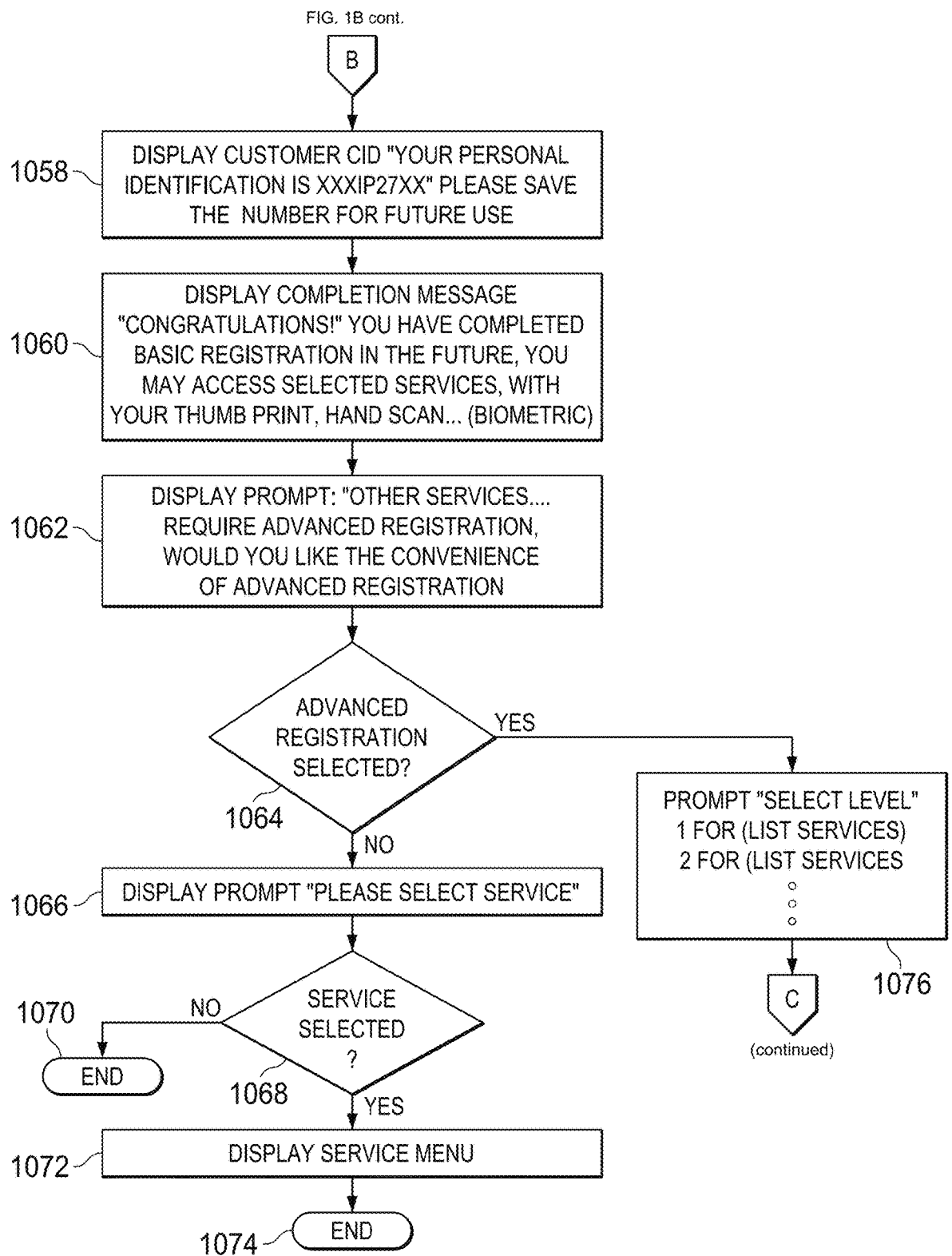
Figure 1B:
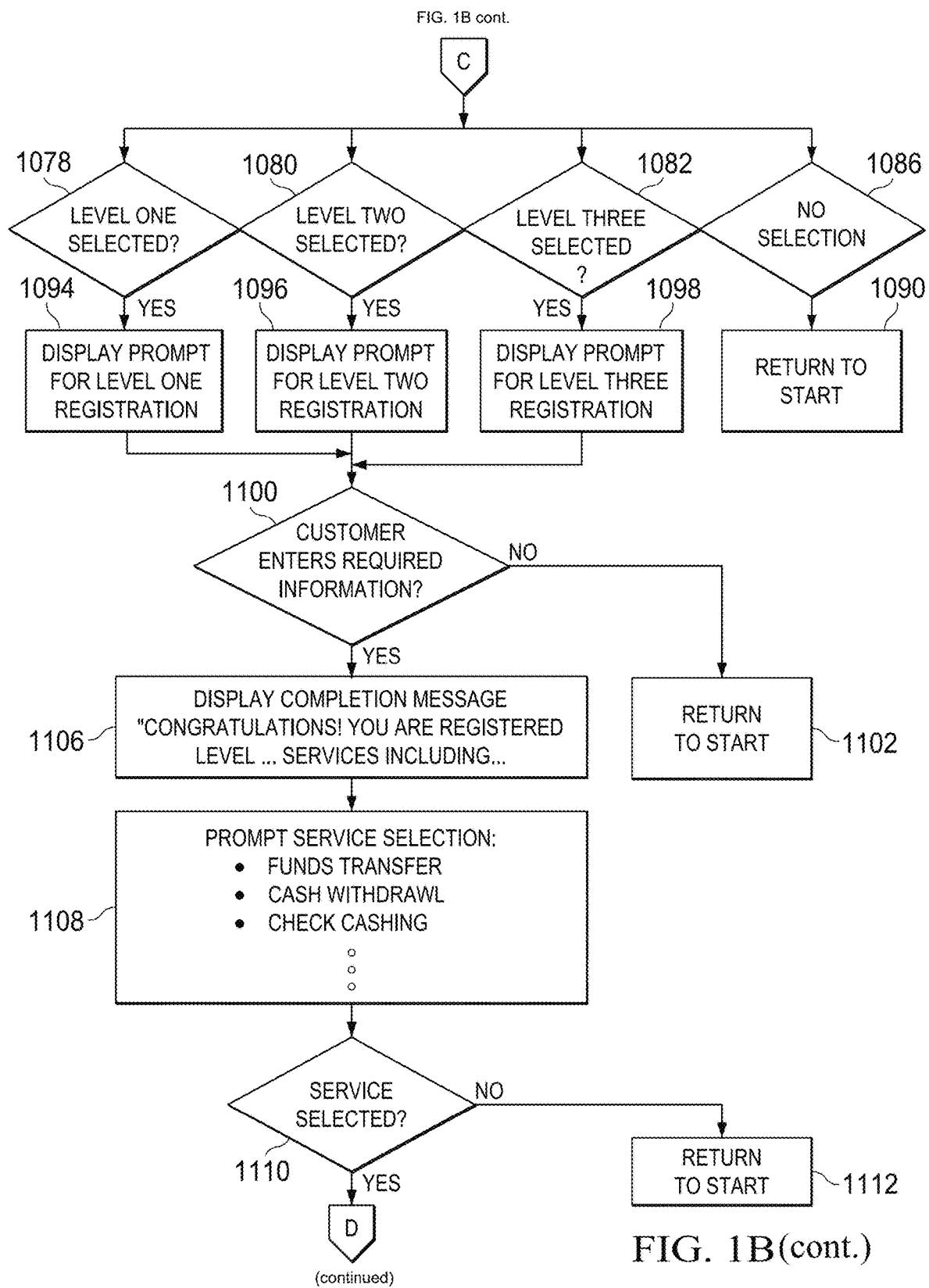
Figure 1B:
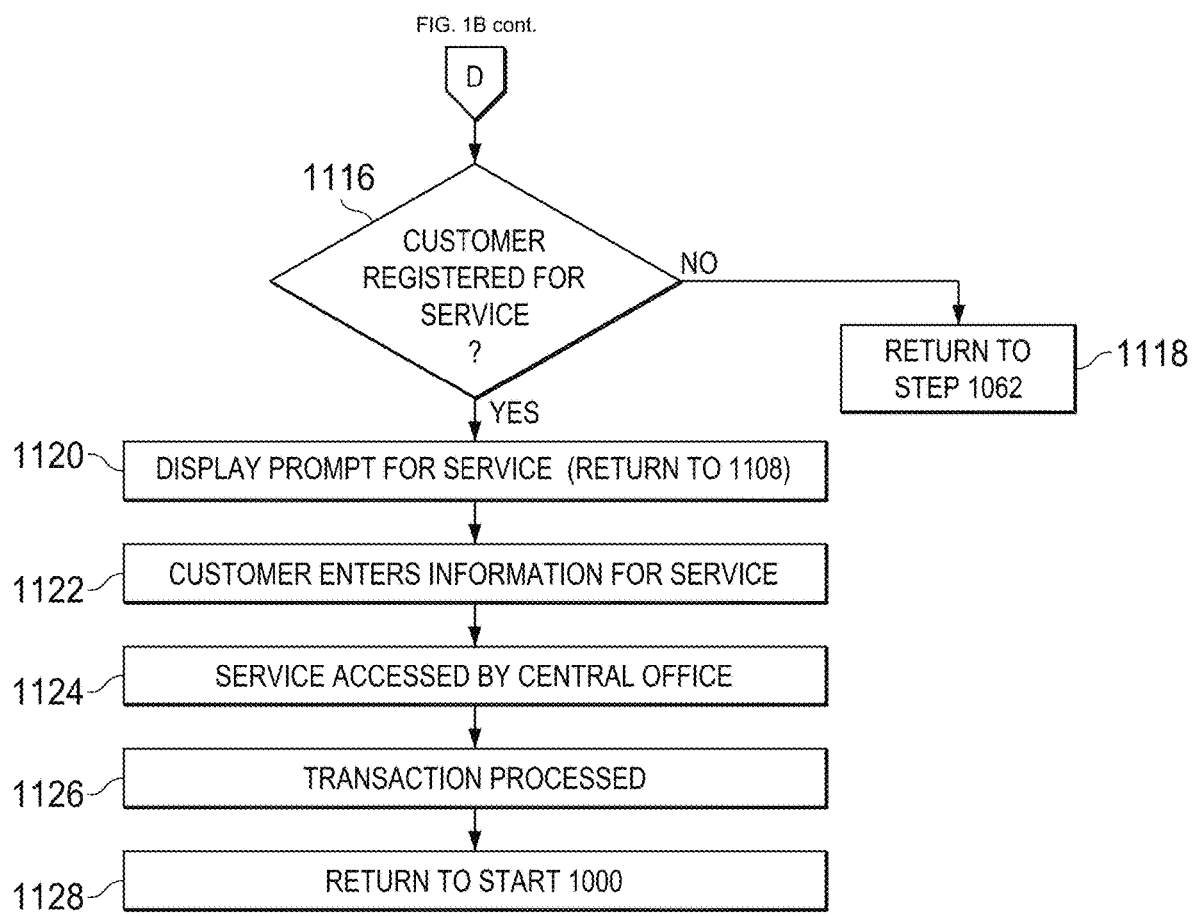

FIG. 1B is a flow chart illustrating a method of formless, seamless registration for potential customers of service providers such as financial institutions to enable potential customers to access such services with a single registration. The process begins at step 1000 where a potential customer approaches a kiosk or remote terminal 110. At step 1002, the customer's presence is sensed at terminal 110 by means of a motion detector, touch screen or similar sensor. At step 1004, a screen is displayed prompting the customer or potential customer to begin. At step 1006, the customer selects "Begin" and at step 1008, the customer is prompted to enter a customer identification number (CID). At step 1010, if the customer enters a CID, the customer may proceed to conduct a financial transaction at 1012 after which the process ends at step 1014. If the customer is not registered or authorized for the service that he or she selects, the process jumps to step 1064 as described hereafter. If the customer elects not to register, at step 1018, the process loops back to Start at 1020.

If the customer elects to register, the customer or potential customer is prompted to scan a photo ID such as a driver's license, passport or similar identification card at step 1024. Preferably, the ID is one that may be verified by accessing a public or private database including records identifying the user. For example, if the customer ID is a driver's license, the ID may be verified by accessing a private or public database containing records of individuals having a driver's license. Such records may include an individual's driver's license number, address, age and a photo of the individual.

If the customer fails to scan a photo ID or if the photo ID is not acceptable, for example if the ID is not legible, the process returns to Start at step 1030. If the photo ID scan is acceptable, the image is captured at step 1034 and the image is processed via optical character recognition (OCR) at 1036. At step 1038, a customer record is created at a central office remote from the kiosk or terminal and the customer record is populated with data from the scanned and processed photo ID at step 1040. At step 1042, the customer image captured from the photo ID at step 1034 is stored in the customer record.

Figure 1C:
FIG. 1C illustrates a representation of a customer record.
Figure 1C:
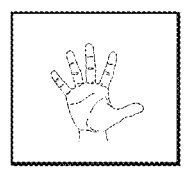
Figure 1C:
Figure 1C:
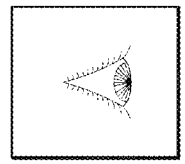
Figure 1C:
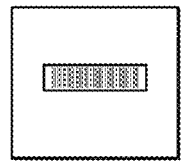

FIG. 1C is a representation of a customer record. The customer record may include fields for information such as a customer's name, customer identification number (CID), a social security number (SSN), a driver's license number, a driver's license expiration date, a library card number, the customer's address, and other pertinent information. In the case where the scanned photo ID is a passport, for example, the pertinent information may be captured from the passport, OCR'd and used to populate the customer record. The customer record may also include a biometric such as a photograph taken by the kiosk or remote terminal, a palm vein scan, a fingerprint, a retinal scan or a voice print.

Returning to FIG. 1B, at step 1040, the customer record is populated with the data scanned and OCR'd from the customer ID. At step 1042, the first customer image from the scanned ID is stored in the customer record. At step 1044, the customer is photographed with a local camera and the photograph may be taken multiple times during the registration process. The second customer image from the local camera is stored in the customer record at step 1046. After the customer image from the scanned ID and the customer photograph have been captured, at step 1048 the customer may be prompted to enter a biometric, e.g., a thumb print, palm vein scan, retinal scan, voice scan, etc. At step 1050, the customer biometric parameter is captured and subsequently stored at step 1052 in the customer record.

During the creation of the customer record at the central office as hereinafter described, the central office may access available public records using the customer's name or other information acquired from the scanned customer ID in order to populate other fields in the customer record as the information may be available. In some instances, if a user is only interested in accessing certain basic services, such as a bill pay service, a biometric parameter may not be required. In this case the process may skip from step 1046 to step 1054. Other services, for example, funds transfer services may require a biometric parameter and additional personal information. The amount of user information required to access a service may be dictated by the service provider or by governmental regulations.

At step 1054, a customer identification number or code (CID) is created and stored in the customer record at step 1056. In different variations, the user may be prompted to enter a CID of his or her choice. This may be done, for example in conjunction with the user photo ID scan. If the CID is assigned by the central office, the CID is transmitted to the terminal or kiosk where it is displayed to the customer. The display may include messages such as, "please save this number for a future reference," or "do not share this number with other people." A CID assigned by the central office may be temporary, in which case, the user may select a different CID at a later date or stage in the process. If the customer CID has not been stored in the customer record, the customer CID is stored in the customer record at step 1058.

At step 1060, the kiosk or remote terminal may display a completion message such as, "congratulations, you have completed basic registration," or a similar message. The display may also include available services or services that are available with a basic registration. The display may also include an instruction such as, "in the future, you may access selected services with your CID and your biometric parameter." During the registration process, discrete pieces of information may be input at 110 and transmitted to central office 116 as the information is collected. For example, a scan of a photo ID may be captured and transmitted to central office 116 for record creation before a biometric parameter, zip code, telephone number or other information is collected. In other variations, all required information may be collected at kiosk or terminal 110 before being transmitted to central office 116 as a single data package after which the central office may create a user record.

Some services may require more personal information than other services. For example, a bill pay service may require minimal basic information while a funds withdrawal or funds transfer transaction may require additional information, such as a biometric parameter. A user may also wish to add additional information to his or her record, such as a biometric parameter as a further safeguard against unauthorized use of the user's registration. At step 1062, the customer may be prompted with a display such as "other services require advanced registration. Would you like the convenience and security of advanced registration?" If the customer does not elect advanced registration at step 1064, the customer is prompted at step 1066 to select a service. If the customer elects not to select a service at step 1068, the process ends at step 1070. If the customer selects a service, the service menu is displayed at step 1072 enabling the customer to access the service after which the process ends at 1074. If a user attempts to access a service requiring advanced registration, for example, require more personal information or the addition of a biometric parameter, the customer will be prompted at step 1062 to add or update his or her record or profile with the information required to access the service.

Alternatively, if the customer selects advanced registration at step 1064, the customer is prompted to select the desired level at step 1076. The different levels may be designated for example as gold, silver or platinum and the services available for each level of registration may be displayed. If the customer selects an advanced level of registration at steps 1078-1082, the customer is prompted at steps 1094-1098 to enter the information required for the selected registration level. Such information may include, for example, a driver's license number, a social security number, an address and/or information regarding the customer's credit lines, for example, credit card information. Alternatively, if the customer fails to select a particular advanced registration level, the process ends at step 1086 and loops back at step 1090 to Start 1000. Likewise, if the customer fails to enter the required information at step 1100, the process ends and returns to Start 1000 at step 1102.

If the customer enters the required information and the entry is confirmed by the central office, a completion display may be displayed to the customer at step 1106 indicating the level of registration that the customer is registered for. The display may include a list of the services that are available to the customer at the selected registration level. At step 1108, the customer is prompted to select a service for which the customer is registered. Such services may include, for example, funds transfer, cash withdrawal, check cashing, etc. If the customer fails to select a service at step 1110, the process ends at step 1112 and loops back to Start 1000. If the customer selects a service at step 1116, the central office confirms whether or not the customer is registered for the selected service. If the customer is not registered for the selected service, the process loops back at step 1118 to step 1062 and the customer is prompted to select an appropriate registration level.

If the customer is registered at the appropriate level for the service, a prompt for the service is displayed at step 1120. The display may prompt the customer to enter information required for the transaction, for example, the amount of the transaction or in the case of a funds transfer, the destination of the funds. The customer then enters the information required to conduct the transaction at step 1122 after which the service is accessed at step 1124 by the central office. The transaction is then processed through the central office at step 1126 after which the process loops back to Start 1000 at step 1128. If the customer is not registered at the appropriate level for the service, the process loops back to step 1062.

Figure 2A:
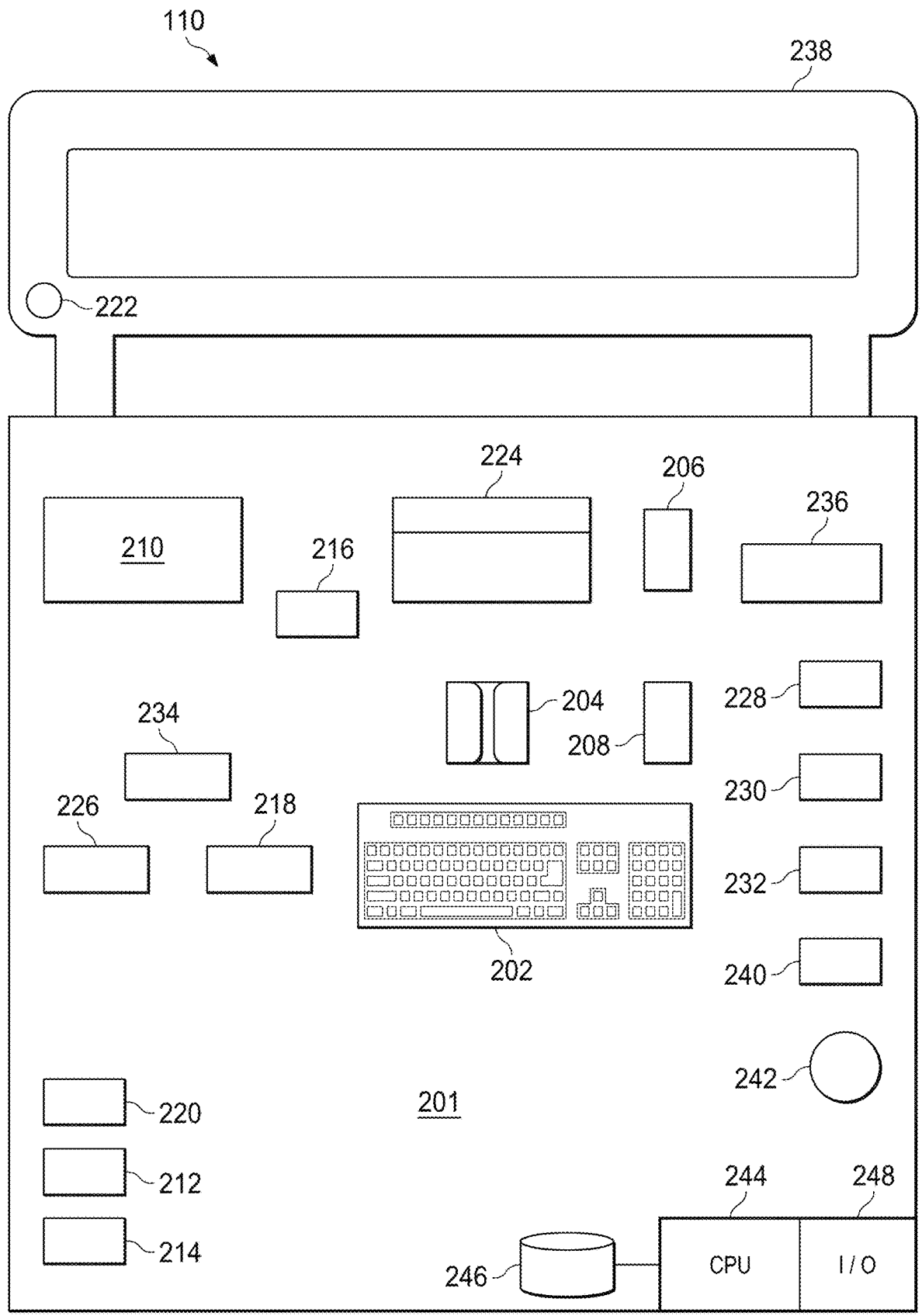
FIG. 2A is diagrammatic illustration of a terminal for use in the system of FIG. 1A.
Figure 2B:
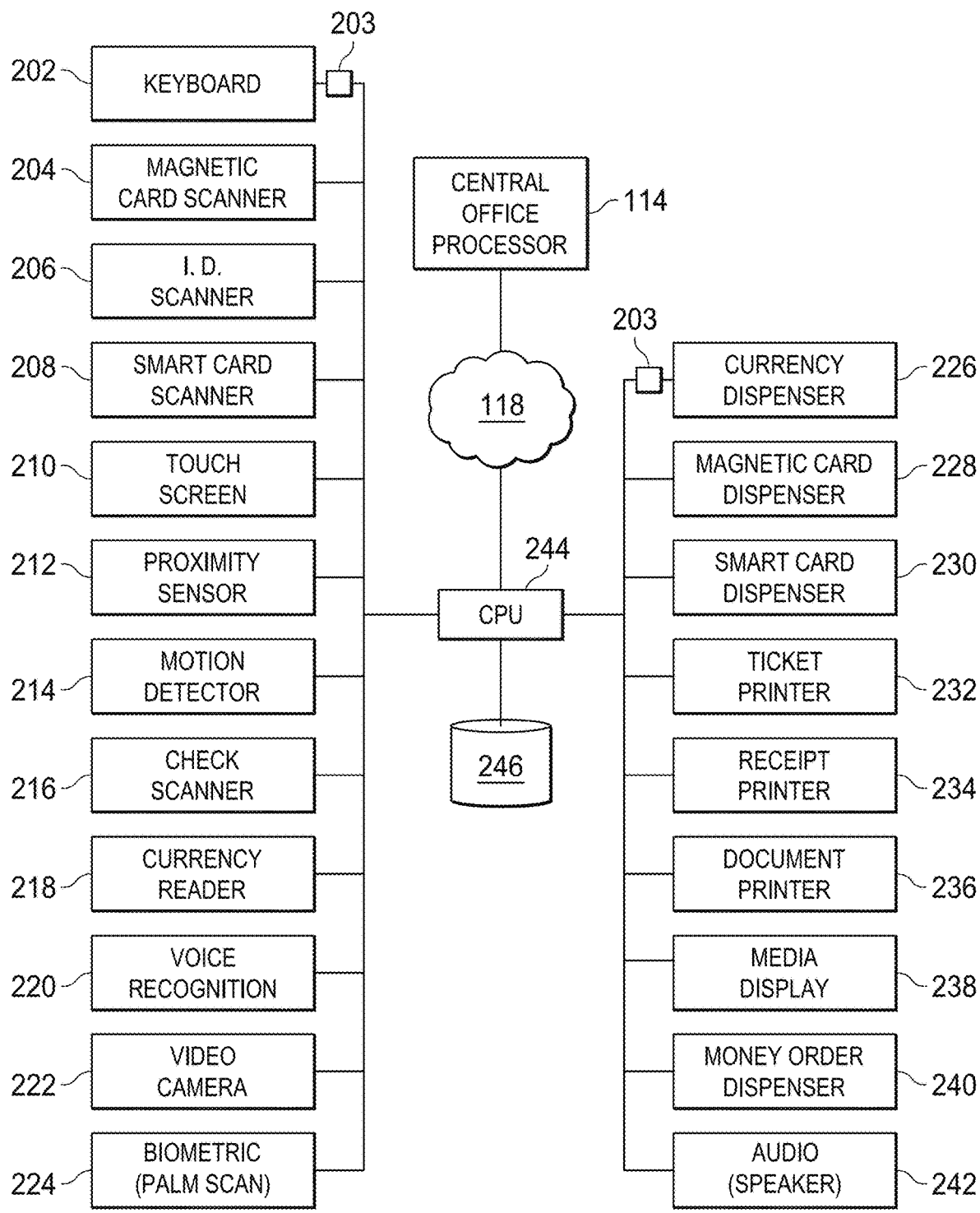
FIG. 2B is a block diagram illustrating one possible configuration for the terminal of FIG. 2A.

Referring to FIGS. 2A and 2B, each of terminals 110 is provided with a number of user interface devices (physical system or external resources) mounted in a housing 201 to allow a user to interface with the terminal 110. In one variation, the devices include a keyboard 202, a magnetic card scanner 204, an ID scanner 206, a smart card scanner 208 and a touch screen 210. Other user interface devices include a proximity sensor 212, a motion detector 214, a check scanner 216, a currency reader 218, a voice recognition model 220 and a video camera 222. Terminal 110 may also include a biometric parameter interface device such as a palm vein scanner 224 for authentication purposes. Each of the user interface devices may be connected to a CPU 244 (terminal processing unit) in terminal 110. Each of the interface devices may be interfaced with CPU 244 via a physical system resource interface 203 including hardware and software enabling the physical system resource to communicate with CPU 244.

Each of terminals 110 may also include a variety of output interface devices (also external resources) that enable the terminal to provide services to users. Such output devices may include a currency dispenser 226, a magnetic card dispenser 228, a smart card dispenser 230, ticket printers 232 and a receipt printer 234. In one embodiment, terminal 110 may also include a document printer 236, a media display device 238, a money order dispenser 240 and an audio output device such as a speaker 242. Referring specifically to FIG. 2A, in one variation, the media display device 238 may comprise a large, flat screen monitor for displaying promotional information such as advertisements for different goods and services. As illustrated, each of terminals 110 also includes a data storage device 246 (data store) associated with CPU 244. In one embodiment, CPU 244 interfaces with central office 116 via a public or private network 118 (communications resource).

Referring still to FIGS. 2A and 2B, in one embodiment each of devices 202-242 are independently controlled. Thus, if one of devices 202-242 fails, for example, if check scanner 216 jams, the individual device or module may be disabled along with the services that it supports without affecting the remaining modules and services. An operating system runs on CPU 244 (processing platform), which, among other functions, monitors the status of available physical system or external resources via the physical system resources interfaces 203. In this manner, terminal 110 functions as a resources manager for managing available physical system or external resources. For example, if ticket printer 232 fails mechanically, the ticket printing services provided by terminal 110 may be disabled while the remaining services provided by the terminal are still available to users. In one embodiment, each of terminals 110 transmits a message to central office processor 114 at predetermined intervals with the status of each of devices 202-242. In the event that a service becomes unavailable due to a hardware failure or similar problem, the particular service may be "grayed out" on screen 210.

Figure 2C:
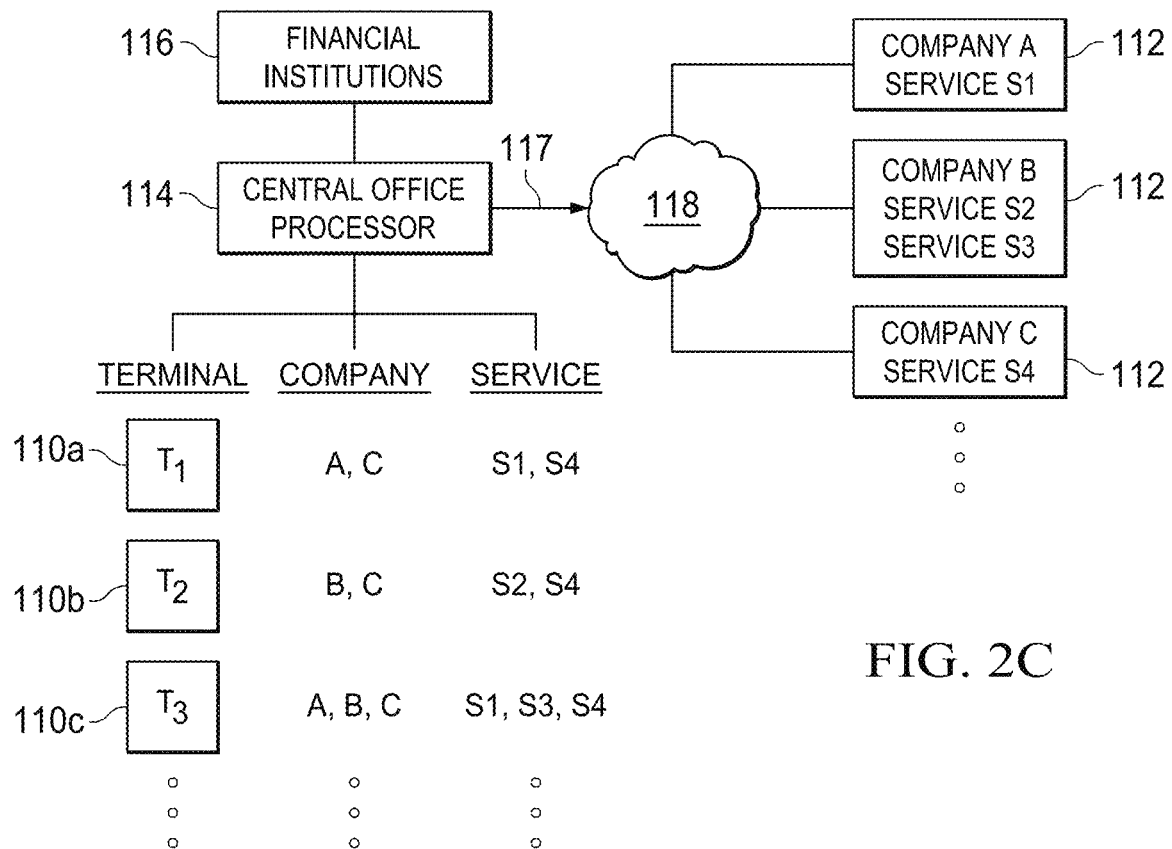
FIG. 2C is a block diagram illustrating the manner in which different terminals may be configured in one embodiment according to the disclosure.

FIG. 2C is a block diagram illustrating the manner in which different terminals 110 may be configured in system 100. Service providers 112 may provide a wide range of different services. Each of the service providers 112 may have configuration information associated with the provider and/or with a service of the provider. The configuration information may include information defining the provider 112, and/or a service that the provider provides. The configuration may also include a "script," e.g., an instruction set defining a set of predetermined actions that are to be completed in a defined sequence to enable access to the service provider and/or service of the service provider. A configuration for a service provider 112 and/or for a service may be downloaded from the service provider to the central office processor 114 and, in turn, downloaded in whole or in part to selected ones of terminals 110 to enable a user to access the service provider of a provider service. The instructions incorporated in the script may be executed by the terminal 110 in conjunction with central office processor 114 to enable a user to access a user-selected service. A given configuration may identify the physical resources required to access a provider 112 and/or service. In many cases, multiple configurations or scripts may require the same physical system resources for execution of an instruction set or script. In some embodiments, the operating system may disable access to a provider 112 or service if a required physical system resource is unavailable.

Referring still to FIG. 2C, company A may provide service s1, company B may provide services s2 and s3 and company C may provide service s4. Such services may include providing tickets for different entertainment events, currency transfers and dispensing a variety of stored value cards such as debit cards, gift cards and telephone cards. However, some services may be more desirable to different population segments at different times due to factors such as demographics, cultural factors, income levels, holidays and the location of a specific terminal 110. Consequently, it may be desirable to configure different terminals 110 to provide different services at different locations or to configure a terminal based on a user profile. For example, as illustrated, terminal 110A may be configured with service modules to provide service s1 and s4 from companies A and C, respectively. Terminal 110B may be configured with service modules to provide services s2 and s4 from companies B and C. Terminal 110C may be configured with service modules to provide services s1, s3 and s4 from companies A, B and C, respectively to pay the customer's bills, transfer funds, print receipts, coupons, money orders, tickets or similar documents.

Figure 2D:
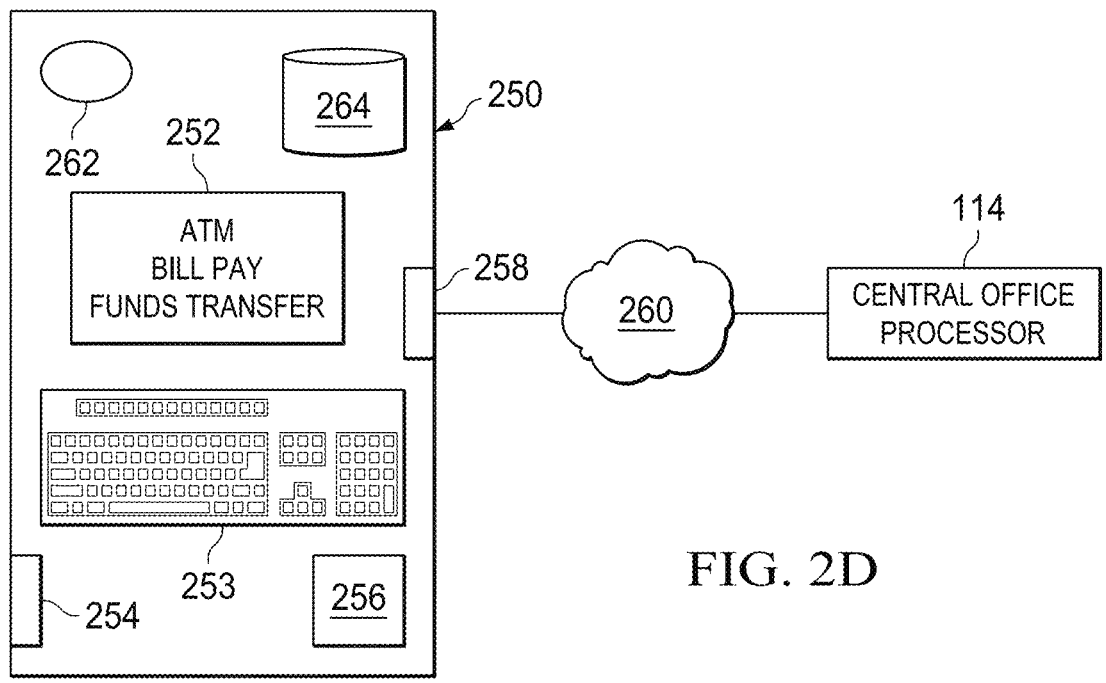
FIG. 2D is a schematic representation of a mobile terminal for use in the system of FIG. 1A.
Figure 2E:
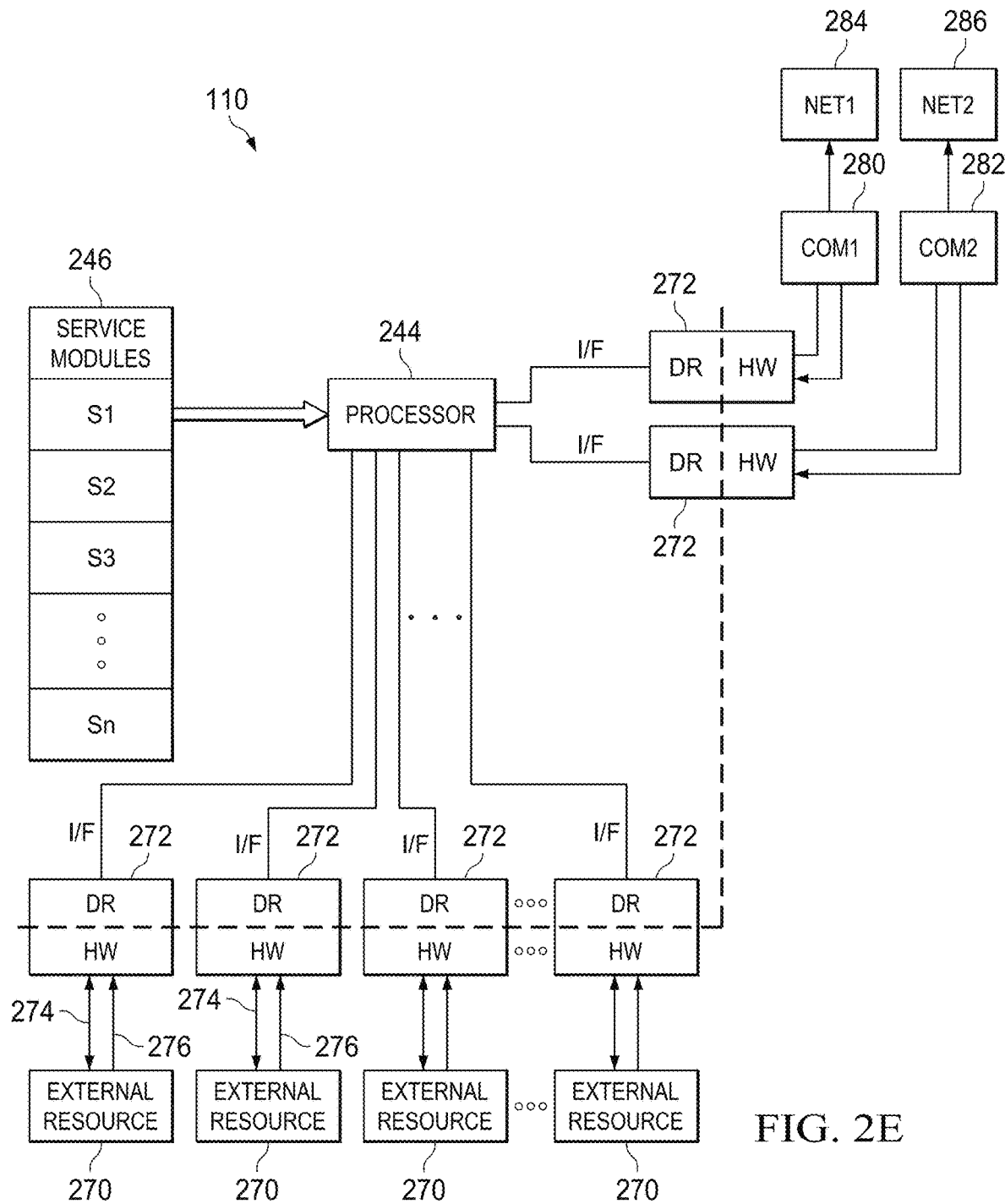
FIG. 2E illustrates a diagrammatic view of the terminal.

Referring now to FIGS. 2D and 2E, there is illustrated a more detailed diagram of the terminal 110 and the manner by which it interfaces with the various physical system or external resources. There is illustrated the processor 244, which is operable to interface with a plurality of external resources 270, which, as described hereinabove, can be any type of hardware resource that allows a user to interface with the various service providers through the central office. In general, the terminal 110 does not possess the capability to allow a user to interface with any kind of service to conduct a financial transaction without being connected to the central office. This is not to say that such could not be implemented. However, for example, if a user were provided a code that could be input to a terminal 110 through the keypad (one of the external resources 270), this would allow the user to retrieve cash from a cash dispenser (another one of the external resources 270). However, if the terminal 110 did not interface with the central office or the service provider through the central office processor 114, then that would require the terminal 110 to have associated therewith all of the information necessary to authorize a particular user on that terminal 110 in addition to preprocessed information about an already in process financial transaction. This would mean that all of the terminals 110 would be required to have all of that information. This is not practical for most financial transactions. These are not pay-as-you go type terminals that would allow a user to input value and receive value therefrom with a percentage of the input value retained as a fee and maintained in the system independent of the operation of any external processing system.

The processor 244 has associated therewith a light operating system that provides the basic operating parameters to interface with the central office, interface with the storage database 246 containing the various service modules, and also interface with the physical system or external resources 270. In order to interface with the external resources 270, there is provided a hardware interface 272 associated with each external resource 270. This external resource basically is a physical terminal or connector that can receive a connection or cable from the external resource 270 and this will typically allow bi-directional communication. Data can be transmitted to the external resource 270 for a printer, for example, and information can be received back from that printer indicating an error. Therefore, there will always be some type of monitor function associated with a particular external resource 270 in addition to a data transfer path.

The data transfer path is illustrated by a path 274 and the monitoring information is represented by a path 276. Any type of well-known connection can be used to provide this. In recent years, most external resources in the form of printers, keyboards, and the like, utilized a conventional communication link such as a serial USB connection. These USB interfaces utilize a common driver interface such that plugging the USB cord from the external resource 270 into the hardware interface will allow the processor 244 to recognize the device and essentially identify that device. Further, after the hardware interface has been provided, there will then be some type of driver software that will be required for the processor 244 to effect an interface with the external resource 270. Even though the hardware interface may be a USB interface or some proprietary interface, there still must be some type of driver software to allow communication with the external resource. For example, a printer may be recognized as a particular printer through a USB interface or other type of serial or parallel port interface, but driver software is required in order to utilize the full functionality of that particular external printer or other external resource. If the external resource 270 were a display, then a particular cable or interface such as a VGA cable would be required to interface with the display. Appropriate drivers would be required for the display. Sometimes, the operating system itself has predefined drivers for displays, as these are somewhat universal. For some resources, however, special drivers would be required to utilize the full functionality of that particular resource.

The processor 244 then manages the resources 270 by keeping a table of available resources. If a resource fails, this will be communicated through the hardware interface to the processor 244 and may, in fact, require the use of the driver software to interface with the external resource 270 to provide this monitoring function. If the resource fails or if it is not connected, this would be recognized by the processor 244. For example, when a particular configuration is provided, it may require a cash dispenser, a keyboard input and a display output in addition to a biometric scanner. The particular software script that comprises part of the service module will require all of these resources in order to function. Therefore, there will be a list of available resources that must exist in order for a particular terminal 110 to constitute a fully operating terminal for that service in accordance with the configuration information provided by the central office processor 114. If one of these resources disappears, this will disable a particular service module and this will be communicated back to the central office 116 during the "heartbeat."

The storage region 246 will be the area where the various service modules "script" is stored. This is the sequence of instructions that must be carried out in order to effect the portion of the transactions that is associated with a particular terminal 110. For example, one of the first transactions that will occur and that constitutes a service module is an authorization module. This authorization module will require authentication of an individual by requiring them to enter certain information, such as name, password, CID information, and even biometric data. This will be utilized to authenticate the individual at the central office 116, after which the user will then be presented a display of the available services that can be used or, more likely, the services will first be provided in a "grayed-out" format to the user and upon authentication, will be un-grayed-out so that the user knows they now have access, i.e., they have been authenticated. After that, the user can then select one of the service modules and, upon selection thereof, the service module will sequentially access the various external resources to effect the transaction in conjunction with the central office 116, as will be disclosed hereinbelow. Thus, each of the service modules s1, s2, s3 . . . sn will be stored therein, which each constitute a portion of the script or transaction process required to be executed by the terminal 110 for a particular service. This is the configuration information that is downloaded from the central office processor 114. However, it should also be understood that a particular terminal 110 could have all of the service modules fully loaded therein and all that the central office 116 would be required to do would be to activate a particular service on a terminal 110.

Two of the resource interfaces 272 are illustrated as being associated with communication external resources, one being an external resource 280 labeled COM1 and a second one 282 labeled COM2. Each of these is interfaced with separate networks 284 and 286, respectively. For example, one communication protocol could be a dial-up modem and the other could be an Ethernet card. Either of these can interface a separate and different network utilizing a separate and different protocol. Both, alternatively, could be the same hardware resource for redundancy purposes. This resource allows the processor 244 to communicate with the central office 116.

Figure 3A:
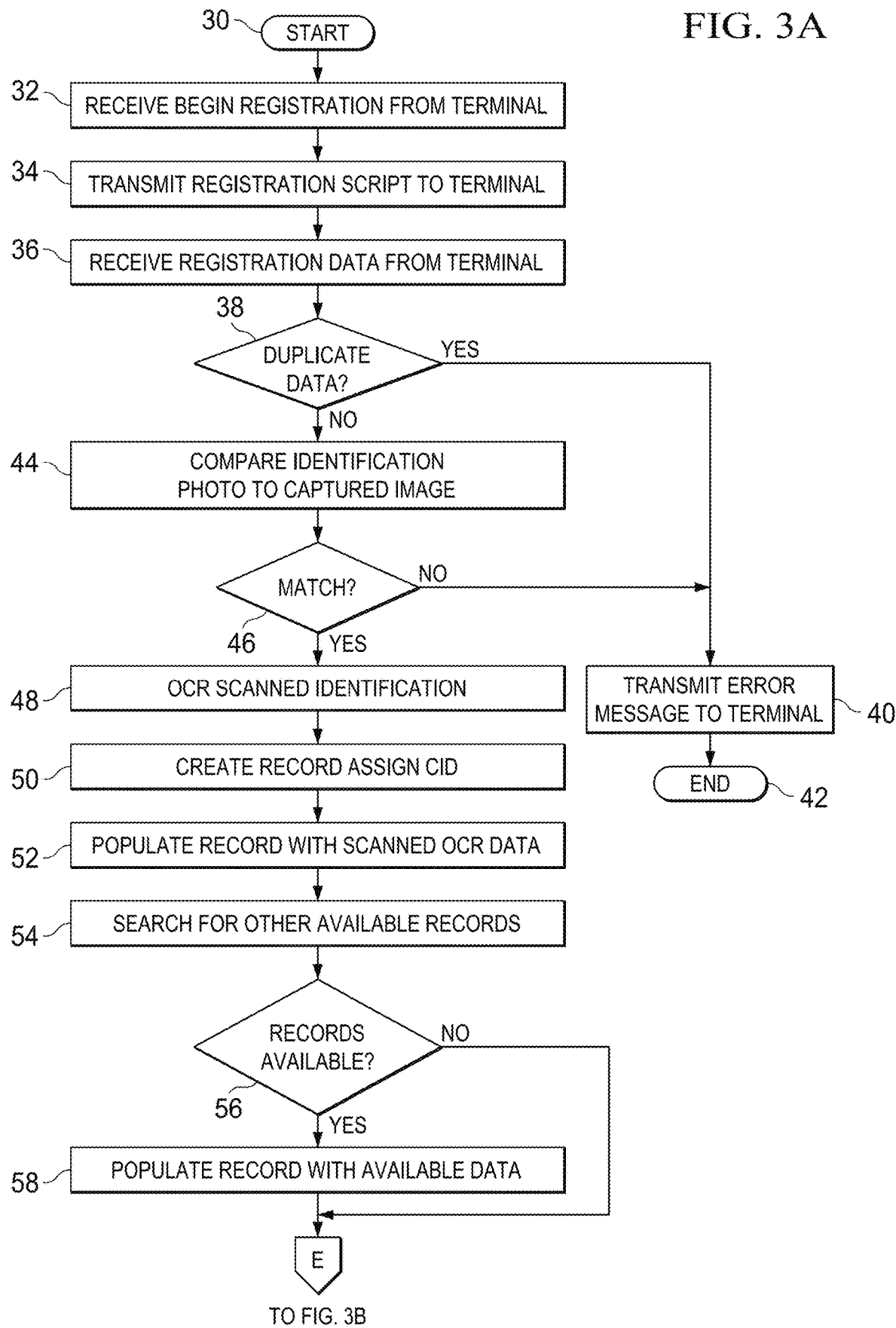
FIGS. 3A and 3B is a flow chart illustrating one method implemented via the system of FIG. 1A.
Figure 3B:
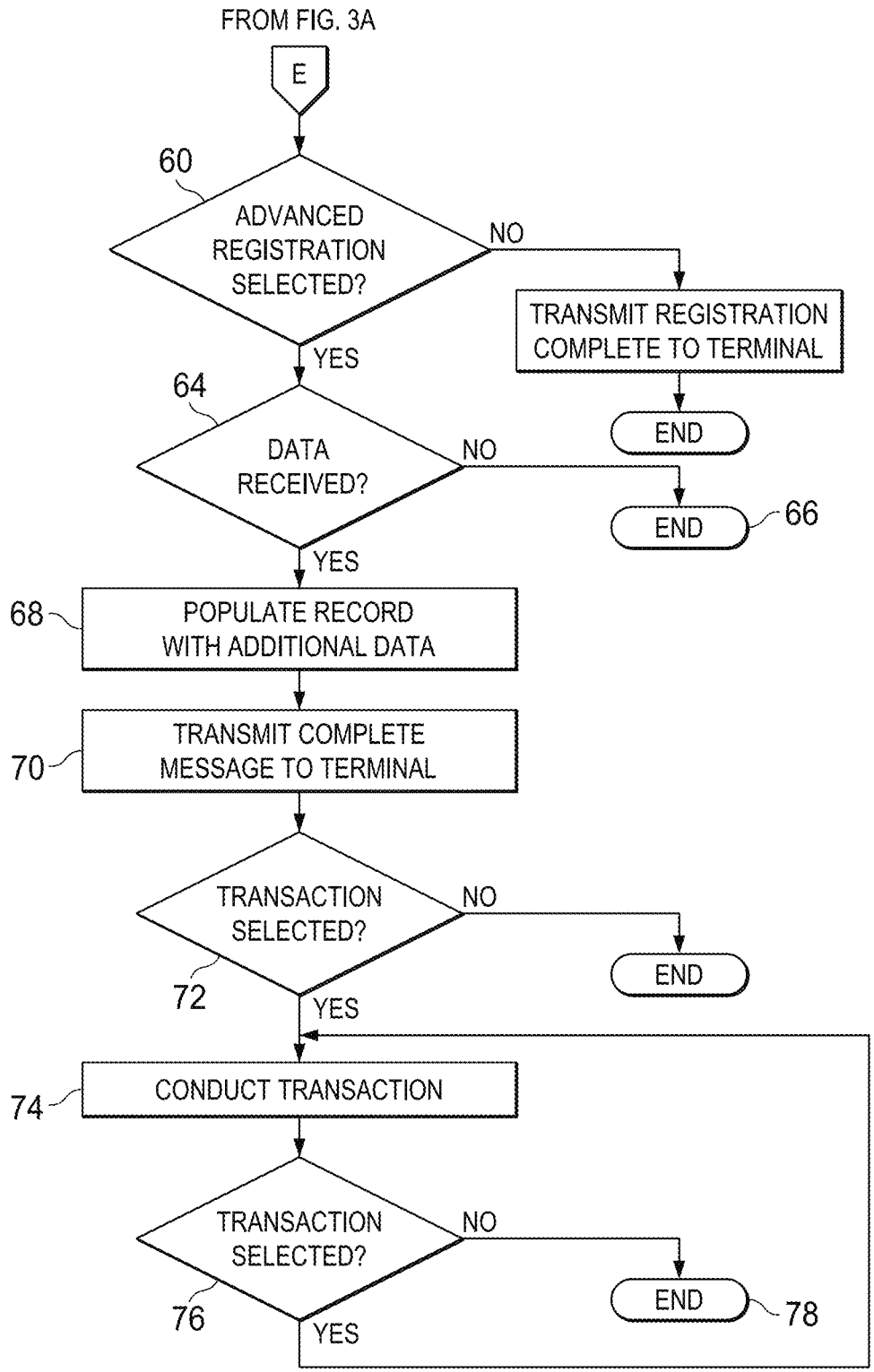

FIGS. 3A and 3B is a block diagram of a method implemented via a system such as system 100 of FIG. 1A. The process begins at 30 where central office 116 receives a message from a terminal 110 at step 32 indicating that an unregistered customer is seeking to conduct a transaction or attempting to register. At step 34, registration script is transmitted from central office 116 to the terminal 110 if the script is not resident on the terminal. It will be understood that the steps described in connection with FIGS. 3A and 3B will be conducted primarily by front end processor 122 of central office 116 except as necessary to interface with a service provider 112.

At step 36, registration data is received from terminal 110. Such information may include a customer biometric and a scanned image of the customer's verifiable ID. It will be understood that the information may be streamed from the terminal to the central office or transmitted as a single block of data. The information is compared to existing customer records to identify possible duplicate records. If it appears that the data duplicates an existing record at step 38, an error message is transmitted to the terminal at step 40 and the process is terminated at step 42. If no duplicate data is detected, at step 44 the image from the user's ID is compared to the image captured by the terminal camera. Preferably, multiple images are captured by the terminal camera to facilitate the comparison. The comparison may be conducted by a human attendant of central office 116 or by an automated system utilizing facial recognition software. If the images do not match at step 46, an error message is transmitted to the terminal at step 40 and the process is terminated at step 42.

If the images match, the image of the user ID is OCR'd at step 48 and a user record is created and a CID is assigned at step 50. The user record is populated with data from the scanned ID at step 52. At step 54, available databases may be queried to identify data that may be used to populate the user record. Such databases may include bill payment records, telephone listing, address listings, employment records and other commercially available databases. If such records are located at step 56, the information is used to populate the user record at step 58. Information obtained in this manner may also be used to conduct a check for duplicate or erroneous data in the user record. For example, the comparison may identify an individual attempting to register using another individual's identity. At this point, the user has completed basic registration and the terminal prompts the user to select advanced registration. If the user elects not to seek advanced registration at step 60, a registration complete message is transmitted to the terminal at step 62, and the process is terminated. If the user elects to proceed with advanced registration, and then fails to complete the registration by providing the required information at step 64, the process is terminated at step 66. If the user information is received, the information is used to populate the user record at step 68 and a registration complete message is transmitted to the terminal at 70. If the user then elects to conduct a transaction at step 72, the transaction is conducted at step 74 and the user is prompted to select another transaction at step 76 and if another transaction is selected, the process loops back to 74. If no transaction is selected, the process is terminated at step 78.

Figure 4A:
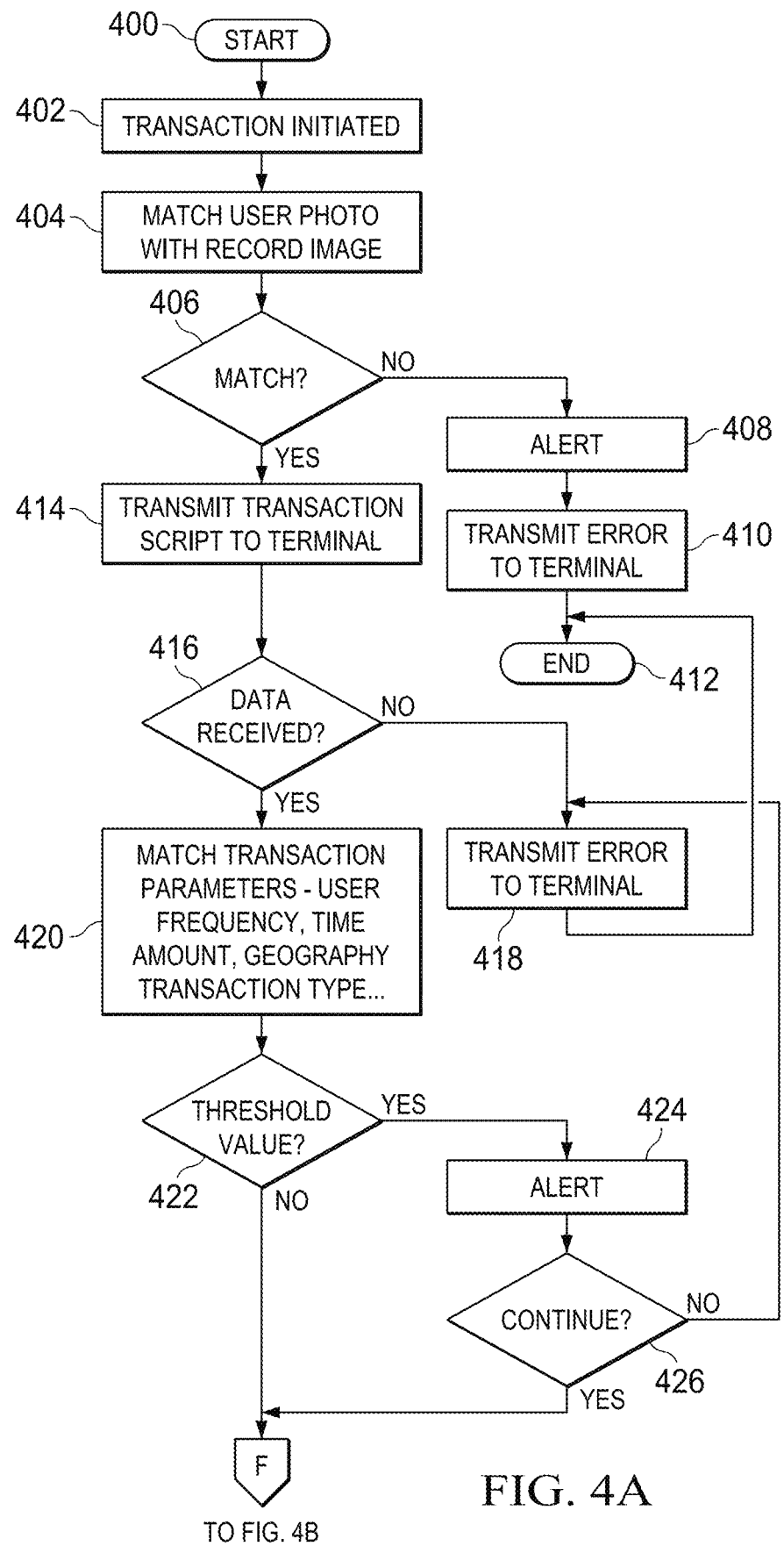
FIGS. 4A and 4B is a flowchart of a second method implemented utilizing the system of FIG. 1A.
Figure 4B:
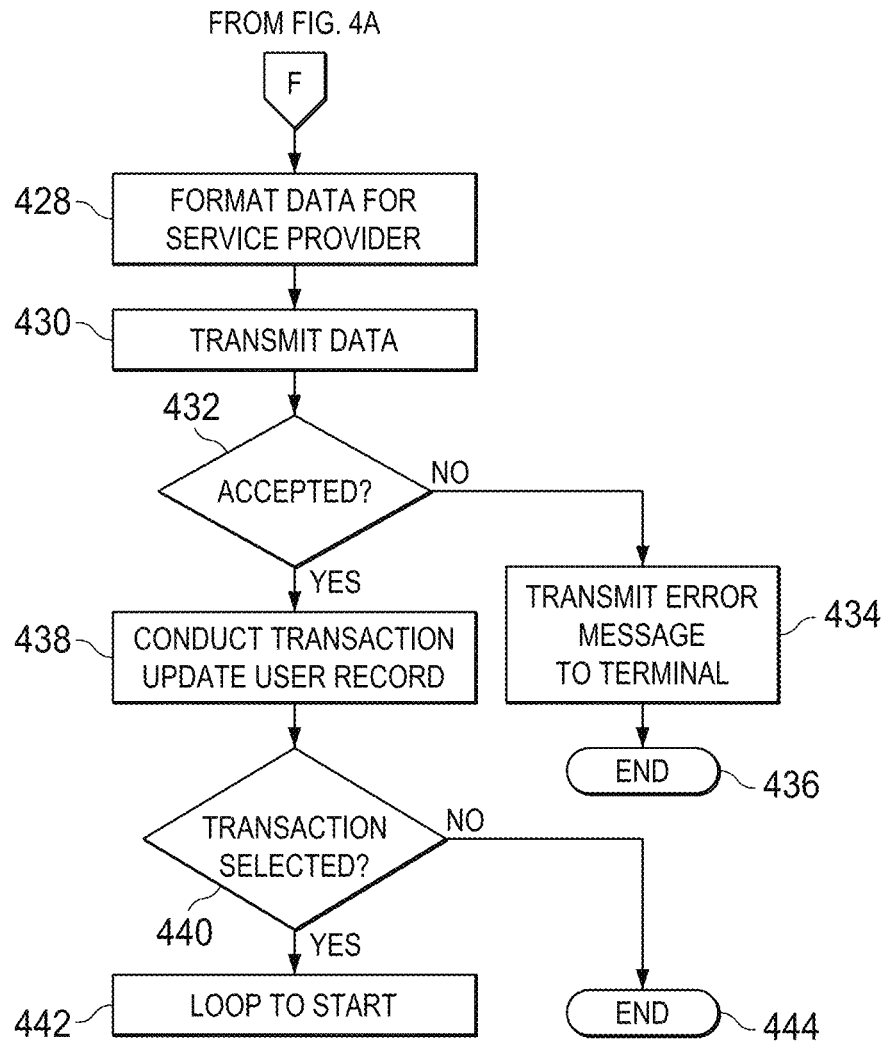

FIGS. 4A and 4B is a flowchart illustrating a method utilizing system 100 of FIG. 1A. At step 400, the process begins with the user initiating a transaction at step 402 by entering the user's CID and biometric parameter. At step 404, the user's photo and/or biometric, obtained by the terminal camera when the transaction is initiated, is compared with the image and/or biometric from the user's record. This check may be done at random, for selected users, or for each transaction. The check may be accomplished by an attendant at central office 116, or the check may be automated, using for example, facial recognition software. If the compared parameters do not match at step 406, the front end processor 122 may initiate an alert at step 408 and transmit an error message to the terminal at step 410 with the process terminating at step 412. The alert may be displayed on a screen at central office 116, alerting an attendant of the mismatch. The user record may also be checked at this step for accuracy and completeness. For example, if the record user photo ID is a driver's license, the expiration date may be checked. If the license is expired, the user may be prompted to update his or her record by scanning a current driver's license. Similarly, the address on the driver's license no longer matches other information in the user record, the user may be prompted to update the information or re-register for the user's selected services.

If the user photo and biometric match the user record, a script for the user selected transaction may be transmitted to the terminal at step 414 if the script is not resident on the terminal. If the central office does not receive the information required for the transaction at step 416, an error message is transmitted to the terminal at 418 and the process is terminated at 412. If the data is received, the transaction and user parameters may be matched based upon preselected criteria at step 420.

Such parameters may include user transaction frequency and type, time, transaction amount, the geographical area where the transaction originated, etc. For example, if a transaction occurs more than, for example 100 miles from the user's address of record, the transaction may be denied. Similarly, if a second transaction is attempted at a geographical location remote from the location of a first transaction within a predetermined time window, the second transaction may be denied. For example, if the first transaction occurred in Chicago at 10:00 am and a second transaction was attempted in Phoenix at 10:20, the second transaction may be denied. Such matching may be used to identify potential fraud, attempts to circumvent federal anti-money laundering regulations and other activity of interest. The results of the match are compared to a threshold value for the selected parameter or parameters at step 422 and if the threshold is exceeded, an alert may be generated at step 424. At step 426 a determination is made as to whether or not to allow the transaction to continue based upon preselected criteria. If the criterion indicates that the transaction should not proceed, the process is terminated at step 412.

If the process is allowed to continue, the user data is formatted and/or compiled for the user by the selected service provider at 428 and transmitted to the provider at 430. The steps of formatting and transmitting the data will be conducted by the back end processor 124 of central office 116. During the course of the transaction, data may be streamed or multiple data blocks and instructions may be transmitted back and forth between the back end processor and the user selected service provider as illustrated and described in U.S. Publication No. 2010/0179990, published Jul. 15, 2010, U.S. patent application Ser. No. 12/684,929, to Cacheria, et al., filed Jan. 9, 2010, the disclosure of which is incorporated herein for all purposes.

If the data is accepted by the selected service provider at step 432, the transaction is conducted and the user's record updated to reflect the transaction. If the service provider rejects the transmitted data, an error message is transmitted to the terminal at step 434 and the transaction is terminated at step 436. If the user selects another transaction at 440, the process loops back to start 400, if not, the transaction is terminated at step 444.

Figure 5:
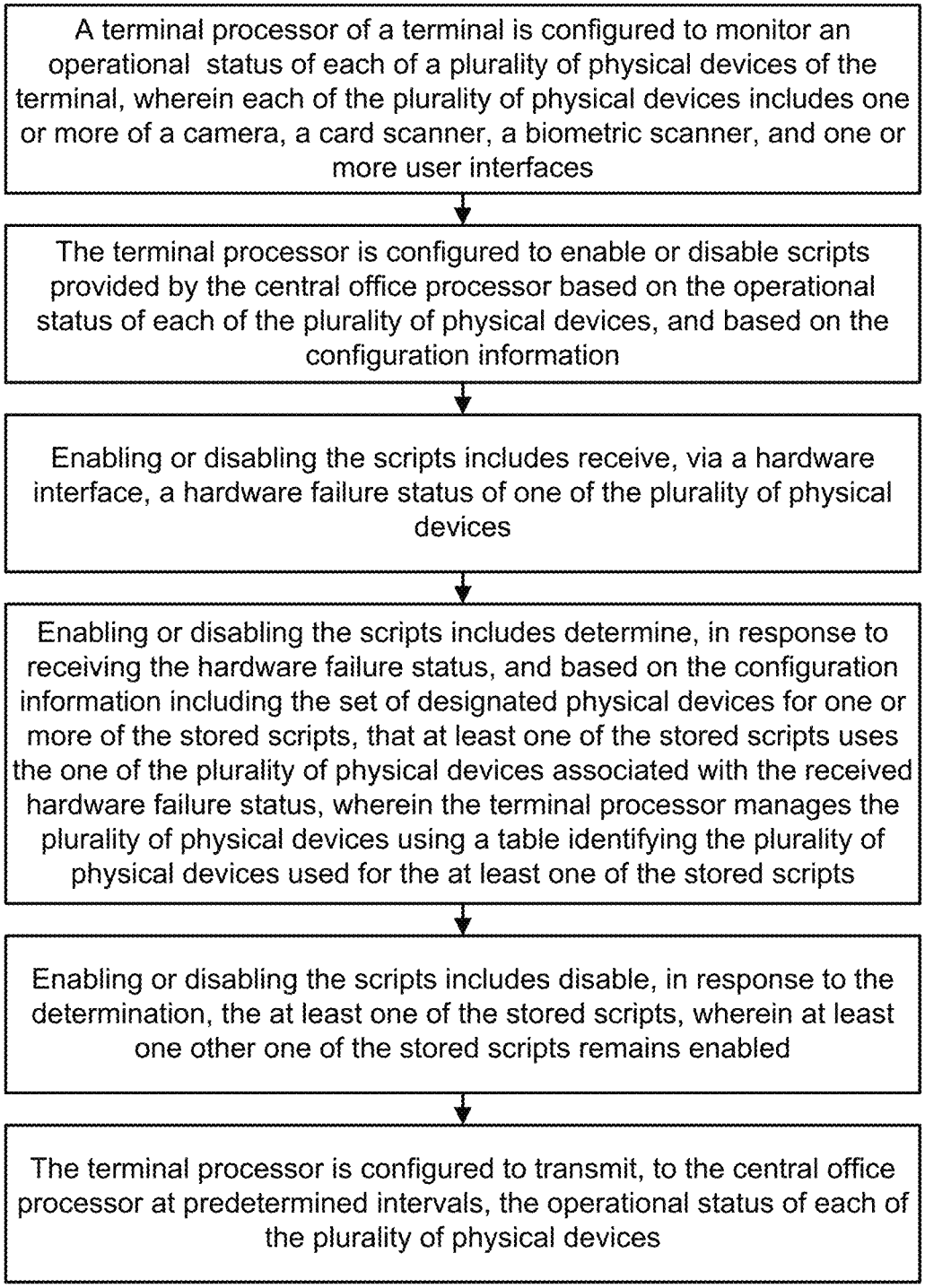
FIG. 5 is a flowchart in accordance with this disclosure.

FIG. 5 is a flowchart in accordance with this disclosure.

It will be appreciated by those skilled in the art having the benefit of this disclosure that this system and method for formless, self-service registration for access to financial services provides a system and method for formless self-service registration for access to financial and other services. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for monitoring hardware of, and managing services provided by, a plurality of terminals, comprising:
a central office linked to the plurality of terminals, wherein the central office includes a central office processor and a communications interface, wherein the central office processor is configured to:
receive a plurality of scripts, wherein each of the plurality of scripts carries out a specific service, and wherein each of the plurality of scripts is associated with configuration information including a set of designated physical devices used to perform the specific service, and
remotely and selectively configure services provided by the plurality of terminals by selectively transmitting one or more of the plurality of scripts and the configuration information to one or more of the plurality of terminals; and
the plurality of terminals each located remotely from the central office and each configured to store scripts from among the plurality of scripts and configuration information transmitted from the central office processor, wherein each of the plurality of terminals includes a terminal processor and a plurality of physical devices each connected to the terminal processor via a hardware interface, wherein each of the plurality of physical devices includes one or more of a camera, a card scanner, a biometric scanner, and one or more user interfaces, and wherein the terminal processor is configured to:
monitor an operational status of each of the plurality of physical devices,
enable or disable scripts provided by the central office processor based on the operational status of each of the plurality of physical devices, and based on the configuration information, including:
receive, via the hardware interface, a hardware failure status of one of the plurality of physical devices,
determine, in response to receiving the hardware failure status, and based on the configuration information including the set of designated physical devices for one or more of the stored scripts, that at least one of the stored scripts uses the one of the plurality of physical devices associated with the received hardware failure status, wherein the terminal processor manages the plurality of physical devices using a table identifying the plurality of physical devices used for the at least one of the stored scripts, and
disable, in response to the determination, the at least one of the stored scripts, wherein at least one other one of the stored scripts remains enabled; and
transmit, to the central office processor at predetermined intervals, the operational status of each of the plurality of physical devices.

2. The system of claim 1, wherein the central office transmits a registration script to at least one of the plurality of terminals that operates the plurality of physical devices of the at least one of the plurality of terminals to register a user for at least one third party external service.

3. The system of claim 2, wherein the registration script is stored on a terminal database of the at least one of the plurality of terminals.

4. The system of claim 1, wherein at least one of the plurality of terminals uses the camera to take multiple photographs of a given user at different times proximate to a time of input of a biometric parameter using the biometric scanner and a customer identification number.

5. The system of claim 1, wherein each of the plurality of terminals further includes at least one camera, wherein the at least one camera takes at least one photograph of a user proximate to a time of input of a biometric parameter using the biometric scanner without knowledge of the user.

6. The system of claim 1, wherein the camera is operable to create a user verification image, the card scanner is operable to create an image of an identification card of a user, the biometric scanner is operable to record a biometric parameter of the user, and the user interfaces are adapted to enable the user to initiate a registration procedure for registering the user for access to third party services.

7. The system of claim 1, wherein the central office further includes a database including a plurality of records for individual users, the records each including a user customer identification number, a user name, a user address, an image of an identification card of the user, a verification image of the user, and an associated biometric parameter of the user.

8. A method for monitoring hardware of, and managing services provided by, a plurality of terminals, the method comprising:
receiving, by a central office processor of a central office, a plurality of scripts, wherein the central office is linked to the plurality of terminals, wherein each of the plurality of scripts carries out a specific service, and wherein each of the plurality of scripts is associated with configuration information including a set of designated physical devices used to perform the specific service;
remotely and selectively configuring, by the central office processor, services provided by the plurality of terminals by selectively transmitting one or more of the plurality of scripts and the configuration information to one or more of the plurality of terminals;
storing scripts from among the plurality of scrips and associated configuration information, transmitted via the central office processor, at the plurality of terminals, wherein each of the plurality of terminals is located remotely from the central office, and wherein each of the plurality of terminals includes a terminal processor and a plurality of physical devices each connected to the terminal processor via a hardware interface;
monitoring, by the terminal processor, an operational status of each of the plurality of physical devices;
enabling or disabling, by the terminal processor, scripts provided by the central office processor based on the operational status of each of the plurality of physical devices, and based on the configuration information, including:
receiving, via the hardware interface, a hardware failure status of one of the plurality of physical devices,
determining, by the terminal processor in response to receiving the hardware failure status, and based on the configuration information including the set of designated physical devices for one or more of the stored scripts, that at least one of the stored scripts uses the one of the plurality of physical devices associated with the received hardware failure status, wherein the terminal processor manages the plurality of physical devices using a table identifying the plurality of physical devices used for the at least one of the stored scripts, and
disabling, by the terminal processor in response to the determination, the at least one of the stored scripts, wherein at least one other one of the stored scripts remains enabled; and
transmitting, via the terminal processor to the central office processor at predetermined intervals, the operational status of each of the plurality of physical devices.

9. The method of claim 8, further comprising storing, on a terminal database of at least one of the plurality of terminals, a registration script, the registration script operating the physical devices of the at least one of the plurality of terminals to register a user for at least one external third party service.

10. The method of claim 8, further comprising taking multiple photographs of a given user during creation of a verifiable user profile proximate to a time of input of a biometric parameter and a unique user code.

11. The method of claim 8, further comprising creating a verifiable user profile including storing a photograph from a verifiable ID in the verifiable user profile.

12. The method of claim 8, further comprising taking multiple photographs of a user with multiple cameras at different angles, wherein at least one of the multiple cameras photograph the user proximate in time to a time of input of one of a verifiable ID or a biometric parameter.

13. The method of claim 8, wherein each of the plurality of physical devices includes one or more of a camera, a card scanner, a biometric scanner, and one or more user interfaces.

14. The method of claim 13, further comprising:
creating, using the camera, a user verification image;
creating, using the card scanner, an image of an identification card of a user;
recording, using the biometric scanner, a biometric parameter of the user; and
enabling, using the user interfaces, the user to initiate a registration procedure for registering the user for access to third party services.

15. The method of claim 8, wherein the central office further includes a database including a plurality of records for individual users, the records each including a user customer identification number, a user name, a user address, an image of an identification card of the user, a verification image of the user, and an associated biometric parameter of the user.

16. The system of claim 1, wherein, to monitor the operational status of each of the plurality of physical devices, each of the plurality of terminals includes one or more drivers configured to monitor at least one of the plurality of physical devices.

17. The method of claim 8, wherein monitoring the operational status of each of the plurality of physical devices includes using one or more drivers in each of the plurality of terminals to monitor at least one of the plurality of physical devices.

* * * * *